Figure 1:
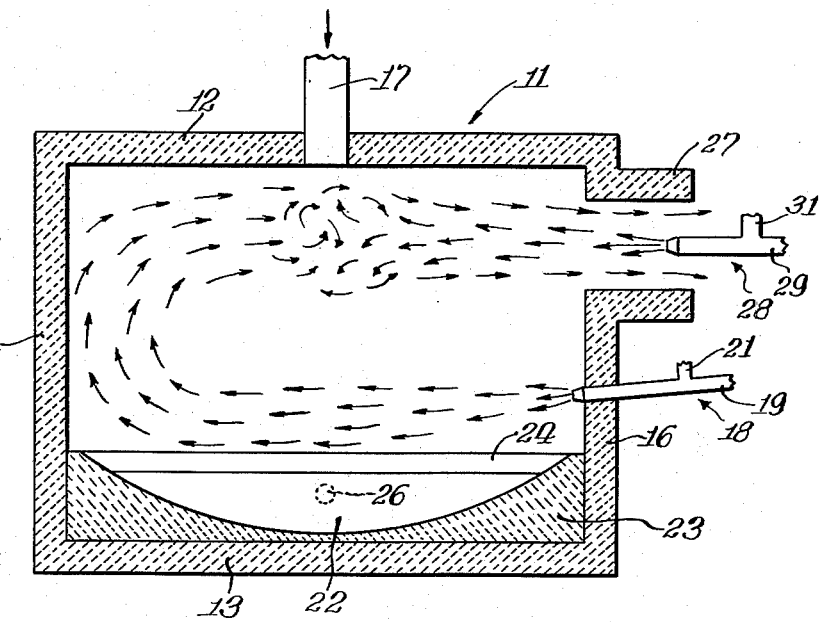

Oct. 3, 1961

E. H. TRAVIS 3,002,736

METHOD OF OPERATING A COMBINED MELTING
HEARTH AND GAS REFORMER

Filed Dec. 8, 1958

INVENTOR.
Edward H. Travis,
BY
Davis, Lindsey, Hibben & Noyes
Attys.

United States Patent Office 3,002,736
Patented Oct. 3, 1961

3,002,736
METHOD OF OPERATING A COMBINED MELTING HEARTH AND GAS REFORMER
Edward H. Travis, Chicago, Ill., assignor to Inland Steel Company, Chicago, Ill., a corporation of Delaware
Filed Dec. 8, 1958, Ser. No. 778,726
7 Claims. (Cl. 263—52)

This invention relates to a combined melting hearth and gas reformer apparatus and to a novel and improved method for carrying out such a combined operation.

The invention is described hereinafter with particular reference to the melting of reduced iron ore, but it will be recognized that the apparatus and method are also applicable in connection with the melting of other solid materials, particularly other metallic materials.

Various schemes have been suggested in the prior art for the direct reduction of iron oxide ore with a reducing gas comprising CO and/or $H_2$. In some instances provision is also made for melting the reduced iron ore to obtain molten iron as a final product of the process. In the latter case it is necessary to provide suitable facilities for melting the reduced iron ore and also for generating a suitable quantity of reducing gas having the desired composition. In accordance with the present invention, a novel unitary apparatus and method are provided for accomplishing both the melting and gas generation functions.

An integrated process for reducing iron oxide ore with CO-rich reducing gas and melting the reduced iron ore may comprise three stages: (1) a combined melting and gas generator zone wherein a fuel is burned with oxygen in order to melt and separate the iron from the reduced ore and at the same time producing combustion gas, (2) an upgrading or gas reforming zone wherein the combustion gas from the first zone is treated to increase its reducing capacity, and (3) a reduction zone wherein subdivided iron ore is contacted with the reformed reducing gas from the second zone and from which the resultant reduced iron ore is passed to the first zone.

In order to supply the thermal requirements of the melting operation, it has been found to be necessary to carry the combustion of fuel in the melting zone to a high degree of completion with the result that the combustion gas in the melting zone has a relatively high $CO_2$ content. Because of its high $CO_2$ content, the combustion gas must be upgraded or reformed before it can be used for ore reduction purposes. In order to achieve an economically feasible process it has also been found that the reforming operation must be carried out by introducing the high $CO_2$ content combustion gas into a reforming zone wherein excess fuel is burned with oxygen and the $CO_2$ content of the combustion gas is thereby reacted with the carbon or hydrogen content of a part of the fuel to form CO. Thus, the combustion of fuel in the melting zone is carried out at a relatively high temperature on the order of 2900° F. to 3500° F. but the endothermic reduction of $CO_2$ to CO in the reforming zone is accomplished at a substantially lower temperature level on the order of 1900° F. to 2400° F.

Although the melting and reforming operations are usually carried out in separate pieces of equipment, it will readily be appreciated that numerous advantages and important economies can be realized if both operations can be carried out in a single unitary piece of equipment.

Accordingly, it is a primary object of the invention to provide a novel combined melting and gas reformer method which is particularly adapted for effecting melting of reduced iron ore and generation of a CO rich gas.

A related object of the invention is to provide a novel combined melting and gas reforming method which is particularly adapted for carrying out the aforementioned functions.

Another object of the invention is to provide a novel method of the foregoing type which afford a high degree of utilization of available heat while at the same time affording protection of the refractory surfaces of the apparatus, especially at the roof thereof.

Figure 2:
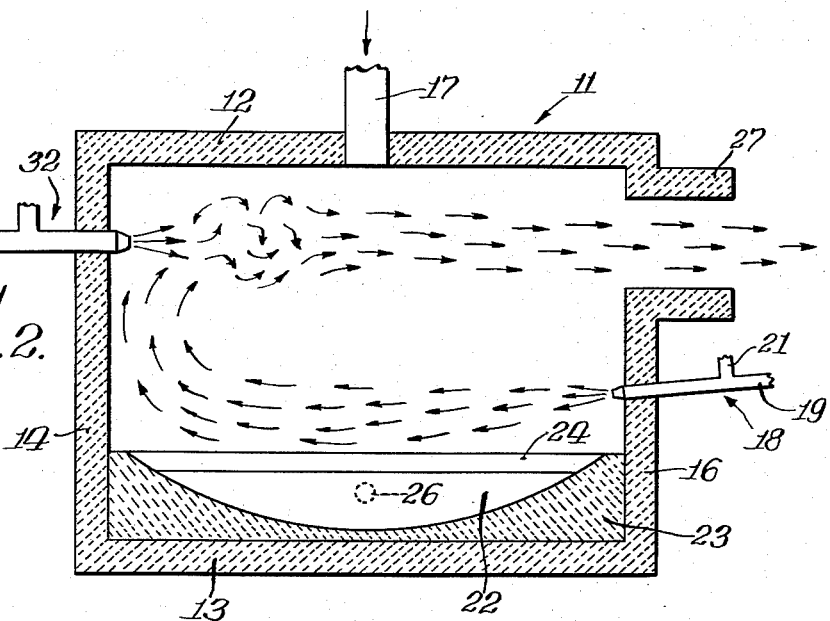

Other objects and advantages of the invention will become evident from the subsequent detailed description as taken in conjunction with the accompanying drawing, wherein:

FIG. 1 is a somewhat diagrammatic sectional view of an apparatus constituting one specific embodiment of the invention; and FIG. 2 is a sectional view showing another embodiment of the invention.

Referring first to FIG. 1, the combined melting and gas reformer apparatus comprises a unitary refractory lined chamber or furnace 11 which in this instance has a generally rectangular cross-sectional configuration with a top wall 12, a bottom wall 13, and an upright peripheral side wall having opposite ends 14 and 16. Reduced iron ore particles are fed to the interior of the chamber 11 from a reducing zone (not shown) through an inlet conduit 17 in the top wall 12. Melting of the reduced iron ore particles is accomplished principally by a primary burner 18 which is disposed generally laterally or horizontally in the end wall 16. Preferably, the fuel fed to the burner 18 comprises pulverized coal which is mixed thoroughly with commercial grade oxygen which may have a purity on the order of 99% free oxygen. Thus, the oxygen may be introduced through a branch 19 of the burner 18 and the pulverized coal may be introduced to the burner through a branch 21 so that the pulverized coal is suspended in the oxygen and premixed therewith prior to ignition at the burner outlet. As will be evident from FIG. 1, the subdivided reduced iron ore particles pass downwardly from the inlet 17 through the flames and combustion products generated by the burner 18, and a pool or bath of molten iron, designated at 22, is collected in a hearth region 23 at the bottom wall 13 of the combustion chamber. A supernatant slag layer 24 may also be formed, the slag resulting from the residual ash of the coal and gangue constituents of the reduced ore, particularly silica and alumina. An outlet 26 may be provided in the side wall of the chamber for withdrawing molten iron or slag.

As previously mentioned, it is necessary in order to meet the thermal requirements of the melting operation to regulate the combustion at the burner 18 so that the coal is burned in large part to $CO_2$ thereby providing a high temperature in the lower portion or melting zone of the chamber 11, e.g. from about 2900° F. to about 3500° F. As will be seen from FIG. 1, the burner 18 is located in the end wall 16 so that the flame and accompanying stream of combustion products are directed with adequate velocity in a generally horizontal direction across the surface of the metal-slag bath 22—24. In accordance with the concept of the invention, it is important that the burner 18 be located closely adjacent the surface of the bath so that the primary combustion takes place immediately above the bath surface. In the upper portion of the combustion chamber closely adjacent the roof or top wall 12, a gas outlet 27 is provided which, in this instance, extends laterally from the end wall 16. The gas outlet 27 is the sole outlet from the chamber 11 for gaseous combustion products and is located above the primary burner 18 in the side wall 16 with the result that the gaseous combustion products from the burner 18 must undergo a reverse flow pattern in order to be discharged from the combustion chamber. Thus, as illustrated by the arrows in FIG. 1, the high temperature combustion gases issuing from the burner 18 are projected in a generally horizontal direction across the surface of the molten iron-slag bath toward the opposite end wall 14 of the chamber 11. At this point the gases flow upwardly and thence reversely toward the outlet 27 in a generally horizontal path at the upper portion of the chamber 11 and closely adjacent the top wall or roof 12.

In order to effect reforming of the high temperature $CO_2$-rich combustion gases produced by the burner 18, a secondary burner 28 is disposed in a generally lateral or horizontal position at the exhaust port or outlet 27, the burner 28 being generally similar to the burner 18 and having an oxygen inlet branch 29 and a pulverized coal branch 31. The burner 28 is fed with excess coal so as to produce a CO-rich gas containing excess or unburned coal. The flame and CO-rich combustion products from the burner 28 are impinged in countercurrent flow relationship against the outwardly flowing stream of combustion products from the burner 18, as indicated by the arrows in FIG. 1 in the upper portion of the combustion chamber 11. The combustion conditions at the burner 28 are regulated so that the CO-rich gas and excess unburned coal are in proper stoichiometric proportion to effect reaction of the unburned or excess coal with the $CO_2$ content of the high temperature combustion gases originating from the burner 18. The moisture or $H_2O$ content of the combustion gases from the burner 18 are also reduced by the action of the burner 28 so that both the CO and $H_2$ content of the reformed gas is increased and the net gas produced in the upper portion of the chamber 11 as withdrawn through the outlet 27 has strongly reducing characteristics.

The endothermic heat requirements of the reduction or reforming reactions which take place in the upper portion of the chamber are supplied by the sensible heat of the high temperature combustion gas stream from the burner 18 and also by the heat evolved from the combustion occurring at the burner 28. By reason of the direct countercurrent impingement between the two gas streams in the upper portion of the combustion chamber 11, a condition of turbulent intermixing and effective heat interchange is realized so that the reforming reactions in the upper portion of the chamber 11 are carried out with a high degree of effectiveness. It will be understood that in the construction of the furnace it is necessary to maintain a sufficient distance between the burners 18 and 28 to minimize premature mixing of the two gas streams. Likewise, the furnace pressures must be properly balanced and maintained in order to obtain the desired reverse flow pattern indicated by the arrows in FIG. 1, it being understood that although the burner 28 is directed inwardly through the exhaust port 27, there is nevertheless a net outflow of reformed gas through the outlet 27.

Thus, it will be seen that by means of the arrangement above described, the interior of the combustion chamber or furnace 11 is effectively divided into two zones: (1) a high temperature melting zone located generally in the bottom portion of the chamber 11 immediately above the surface of the bath 22—24, and (2) a lower temperature reforming zone in the upper portion of the chamber 11 immediately below the roof or top wall 12. Because of the endothermic nature of the reduction reactions taking place in the reforming zone immediately below the roof 12 and because of the fact that the burner 28 is fed with excess fuel so that combustion is predominantly to CO, it will be understood that the temperature in the reforming zone and likewise the temperature of the effluent reformed gas withdrawn through the outlet 27 will be substantially lower than the temperature which prevails in the melting zone at the lower portion of chamber 11. For example, the temperature in the reforming zone and in the gas outlet 27 may be from about 1900° F. to about 2400° F. as compared with a temperature of from about 2900° F. to about 3500° F. in the melting zone. By suitable regulation of the operation of the burners 18 and 28 and by control of the gas withdrawal through the outlet 27 so as to maintain the desired pressure relationships within the furnace 11, the illustrated reverse flow circulation pattern is readily obtained and the temperature differential between the lower and upper portions of the furnace 11 is also effectively maintained. Although it is possible to introduce the reduced iron ore solids in various ways, it is preferred to introduce the solids to be melted downwardly through the roof as indicated by the inlet conduit 17 so that the solids pass first through the relatively lower temperature reforming zone and thence through the high temperature gas stream in the melting zone before reaching the liquid pool 22—24.

The structural simplicity of the apparatus is self-evident so that initial construction costs are greatly minimized as compared with the use of completely separate melting and gas reforming units. Moreover, the provision of an endothermic gas reforming reaction zone immediately below the top wall or roof 12 of the furnace affords very substantial protection for the roof refractories thereby minimizing refractory replacement costs. In addition, by reason of the fact that the melting and reforming operations are carried out in a compact unitary apparatus with a relatively short path of travel between the melting and reforming zones, it is possible to realize a very high degree of utilization of the sensible heat contained in the high temperature combustion products from the burner 18. Thus, the quantity of endothermic heat which must be supplied from the burner 28 is substantially decreased so that the oxygen consumption at the burner 28 is minimized.

In FIG. 2, a slightly different embodiment of the invention is illustrated. All of the parts of the FIG. 2 embodiment which are the same as shown in FIG. 1 have been designated by the same reference numerals. Thus, the furnace 11 has a top wall 12, a bottom wall 13, and ends walls 14, 16. The primary burner 18 is located in the end wall 16 just as in FIG. 1 so that the high temperature $CO_2$-rich products of combustion are directed horizontally in the same manner across the metal-slag pool 22—24 which is maintained in the hearth region 23 at the bottom of the furnace. As before, the sole gas outlet from the apparatus is the exhaust port 27 which is located above the burner 18 in the end wall 16. The overall pattern of gas flow is essentially the same as in FIG. 1 so that the gases issuing from the burner 18 pass horizontally across the surface of the bath 22—24, thence upwardly adjacent the end wall 14, and thence in reverse flow toward the outlet 27 immediately below the roof 12, as indicated by the arrows. In this embodiment, however, the secondary burner, designated at 32, is located in the end wall 14 at the upper portion of the furnace 11 in substantial alignment with the outlet 27. Consequently, the CO-rich combustion products containing excess carbon from the burner 32 are introduced in concurrent flow relationship into the reversely flowing stream of primary combustion products, the two streams being merged in this instance at approximately the point of tangency as the primary stream reverses its direction of flow. As indicated by the arrows, a region of turbulent intermixing and effective heat interchange is likewise accomplished by the concurrent flow mixing of the relatively high temperature and relatively low temperature streams so that the endothermic reforming reactions are readily obtained just as in the first embodiment of the invention. It will be evident to those skilled in the art that the operation of burners 18 and 32 and the withdrawal of reformed gas through the outlet 27 can readily be regulated to provide the necessary pressure relationships within the furnace so as to achieve the illustrated flow pattern. All of the advantages described above in connection with FIG. 1 are likewise obtained in the FIG. 2 embodiment of the invention but with the additional advantage that the mounting and operation of the secondary burner 32 is simplified by reason of its location in the end wall 14 rather than in the region of the gas outlet port 27.

From the foregoing, it will be seen that the invention provides a unitary melting and gas reforming apparatus and method which are adapted to accomplish high temperature melting and generation of a reducing gas in a single combustion chamber. The operation of the chamber is such that it is possible to maintain a relatively high temperature melting zone and a relatively lower temperature gas reforming zone within the same enlarged combustion space without the necessity for special structural precautions.

Although the invention has been described with particular reference to certain specific structural embodiments thereof, it is to be understood that various modifications and equivalents may be resorted to without departing from the scope of the invention as defined in the appended claims.

I claim:

1. A combination melting and gas reforming method which comprises producing a relatively high temperature flame by burning a carbonaceous fuel with excess oxygen to produce combustion products rich in $CO_2$, directing said relatively high temperature flame and gaseous combustion products across the surface of a pool of molten material at the bottom portion of a combustion chamber feeding solid material to be melted into said chamber, guiding said combustion products upwardly and thence in a reversely flowing stream across the upper portion of said chamber, commingling with said reversely flowing stream a flame and combustion products containing excess carbonaceous fuel for converting $CO_2$ in said stream to CO at a relatively lower temperature, and withdrawing a reformed CO-rich gas from the upper portion of said chamber at a point above said high temperature flame.

2. A combination melting and gas reforming method which comprises maintaining a pool of molten material in the bottom portion of a combustion chamber, introducing solid material to be melted into said chamber, burning carbonaceous fuel with an excess of oxygen to produce a relatively high temperature flame and combustion products rich in $CO_2$ in the lower portion of said chamber and directing the resultant high temperature flame and $CO_2$-rich combustion products across the surface of said pool, guiding said $CO_2$-rich combustion products upwardly and thence in a reversely flowing stream across the upper portion of said chamber, burning excess carbonaceous fuel with oxygen in the upper portion of said chamber and commingling the resultant CO-rich combustion products containing excess carbonaceous fuel with said reversely flowing stream for converting $CO_2$ in said stream to CO at a relatively lower temperature, and withdrawing a reformed CO-rich gas from the upper portion of said chamber at a point above the region of said first-mentioned burning step.

3. The method of claim 2 further characterized in that the step of introducing solid material into said chamber is effected by feeding said solid material through the upper portion of said chamber downwardly into said pool.

4. A combination melting and gas reforming method which comprises maintaining a pool of molten material in the bottom portion of a combustion chamber, introducing solid material to be melted into said chamber, burning carbonaceous fuel with an excess of oxygen in the lower portion of said chamber to produce a relatively high temperature flame and combustion products rich in $CO_2$ and directing the resultant high temperature flame and $CO_2$-rich combustion products across the surface of said pool, guiding said $CO_2$-rich combustion products upwardly and thence in a reversely flowing stream across the upper portion of said chamber, burning excess carbonaceous fuel with oxygen in the upper portion of said chamber and impinging the resultant $CO_2$-rich combustion products containing excess carbonaceous fuel in directly opposed countercurrent relation against said reversely flowing stream for converting $CO_2$ in said stream to CO at a relatively lower temperature, and withdrawing a reformed CO-rich gas from the upper portion of said chamber at a point above the region of said first-mentioned burning step.

5. The method of claim 4 further characterized in that the step of introducing solid material into said chamber is effected by feeding said solid material through the upper portion of said chamber downwardly into said pool.

6. A combination melting and gas reforming method which comprises maintaining a pool of molten material in the bottom portion of a combustion chamber, introducing solid material to be melted into said chamber, burning carbonaceous fuel with an excess of oxygen in the lower portion of said chamber to produce a relatively high temperature flame and combustion products rich in $CO_2$ and directing the resultant high temperature flame and $CO_2$-rich combustion products across the surface of said pool, guiding said $CO_2$-rich combustion products upwardly and thence in a reversely flowing stream across the upper portion of said chamber, burning excess carbonaceous fuel with oxygen in the upper portion of said chamber and directing the resultant CO-rich combustion products containing excess carbonaceous fuel into said reversely flowing stream in substantially concurrent flow relation therewith for converting $CO_2$ in said stream to CO at a relatively lower temperature, and withdrawing a reformed CO-rich gas from the upper portion of said chamber at a point above the region of said first-mentioned burning step.

7. The method of claim 6 further characterized in that the step of introducing solid material into said chamber is effected by feeding said solid material through the upper portion of said chamber downwardly into said pool.

References Cited in the file of this patent

UNITED STATES PATENTS

| 740,786 | Uren | Oct. 6, 1903 |
| 1,225,470 | Moore | May 8, 1917 |
| 2,084,830 | Barnard et al. | June 22, 1937 |

FOREIGN PATENTS

| 601,187 | France | Feb. 24, 1926 |

UNITED STATES PATENT OFFICE
CERTIFICATE OF CORRECTION

Patent No. 3,002,736　　　　　　　　　　　　　　October 3, 1961

Edward H. Travis

It is hereby certified that error appears in the above numbered patent requiring correction and that the said Letters Patent should read as corrected below.

Column 1, line 32, strike out "may comprise three stages; (1) a combined melting and" and insert the same after "iron ore" in line 30, same column 1; column 4, line 37, for "ends" read -- end --; column 6, line 13, for "$CO_2$-rich" read -- CO-rich --.

Signed and sealed this 3rd day of April 1962.

(SEAL)
Attest:

ERNEST W. SWIDER　　　　　　　　　　　　　　DAVID L. LADD
Attesting Officer　　　　　　　　　　　　　　　Commissioner of Paten